(12) United States Patent
Foti et al.

(10) Patent No.: US 9,703,532 B1
(45) Date of Patent: Jul. 11, 2017

(54) DYNAMICALLY UPDATING CLASS INSTANCES BASED ON CLASS DEFINITION CHANGES

(71) Applicant: The MathWorks, Inc., Natick, MA (US)

(72) Inventors: David A. Foti, Holliston, MA (US); Jennifer A. Black, Ashland, MA (US); Marc A. Greenberg, Holliston, MA (US)

(73) Assignee: The MathWorks, Inc., Natick, MA (US)

(*) Notice: Subject to any disclaimer, the term of this patent is extended or adjusted under 35 U.S.C. 154(b) by 0 days.

(21) Appl. No.: 14/502,610

(22) Filed: Sep. 30, 2014

(51) Int. Cl.
*G06F 9/44* (2006.01)

(52) U.S. Cl.
CPC .................... *G06F 8/33* (2013.01)

(58) Field of Classification Search
CPC ........................................................ G06F 8/33
USPC ......................................................... 717/110
See application file for complete search history.

(56) References Cited

U.S. PATENT DOCUMENTS

| | | | | |
|---|---|---|---|---|
| 8,789,017 | B2* | 7/2014 | Orofino et al. | 717/121 |
| 2005/0198621 | A1* | 9/2005 | Tillmann | G06F 11/3624 |
| | | | | 717/128 |
| 2005/0267773 | A1* | 12/2005 | Patton | G06Q 10/10 |
| | | | | 705/1.1 |
| 2008/0301636 | A1* | 12/2008 | Khan | 717/118 |
| 2009/0164521 | A1* | 6/2009 | Lo et al. | 707/104.1 |
| 2010/0305721 | A1* | 12/2010 | Kostadinov et al. | 700/87 |
| 2011/0088011 | A1* | 4/2011 | Ouali | G06F 8/10 |
| | | | | 717/105 |
| 2011/0153559 | A1* | 6/2011 | Rangarajan et al. | 707/609 |
| 2014/0100676 | A1* | 4/2014 | Scott et al. | 700/83 |

OTHER PUBLICATIONS

Wikipedia, "Class (computer programming)", http://en.wikipedia.org/wiki/Class_(computer_programming), Sep. 29, 2014, 16 pages.

\* cited by examiner

*Primary Examiner* — Li B Zhen
*Assistant Examiner* — Bradford Wheaton
(74) *Attorney, Agent, or Firm* — Harrity & Harrity, LLP (57) ABSTRACT

A device may detect a modification of a class, included in program code, from a first class definition to a second class definition that is different from the first class definition. The device may create a relationship indicator that references the second class definition and that indicates that the class has been modified. The device may store an association between the class and the relationship indicator. The device may access an instance of the class associated with the first class definition. The device may detect the association between the class and the relationship indicator based on accessing the instance of the class. The device may update the instance of the class, using the second class definition, based on detecting the association between the class and the relationship indicator.

20 Claims, 8 Drawing Sheets

DYNAMICALLY UPDATING CLASS INSTANCES BASED ON CLASS DEFINITION CHANGES

DETAILED DESCRIPTION

The following detailed description of example implementations refers to the accompanying drawings. The same reference numbers in different drawings may identify the same or similar elements.

In computer programming, a class may refer to an extensible program code template for creating instances of the class. A class definition may identify particular variables or data to be stored by a class instance, particular methods or functions that may be performed using the class instance, particular events generated by a class object, or the like. When programming, a computer programmer may write program code to create a class and/or a class definition, and also to create instances of the class (e.g., may write program code in a file, via a command line, via a code editor, in a graphical modeling environment, or the like). Once the program code has executed and the instances have been created, the computer programmer may modify the class definition in a way that impacts the created instances. This may cause issues or bugs in the computer program, or may cause the created instances to be deleted to avoid such issues or bugs, thereby slowing down the programming process and creating rework for the computer programmer. Implementations described herein permit class definition changes to be propagated to class instances on-the-fly, such as while the computer program is executing or as a class instance is accessed, without having to delete or recreate the class instances.

When a user is interacting with a command line interface, stepping through program execution in a debugger, or working with a graphical programming interface, objects may exist within the environment. While those objects exist, a class definition could be modified. Implementations described herein allows such modifications to take immediate effect or appear to the user to take immediate effect. This means that existing instances of the modified class will take on the form and behavior of the new class definition and that new instances created by the programmer will follow the new class definition. It is often desirable for a system to maintain a single definition of a specific class. This allows operations on different instances to be consistent. In an array-based language such as MATLAB, it also allows instances of the same class to be grouped into vectors, matrices, and n-dimensional arrays where each element is an object having a consistent definition (e.g., a consistent set of data members and definitions of operations). This allows vector and matrix operations to be performed on the whole array without concern for disparate definitions of the elements in the array.

Figure 1:
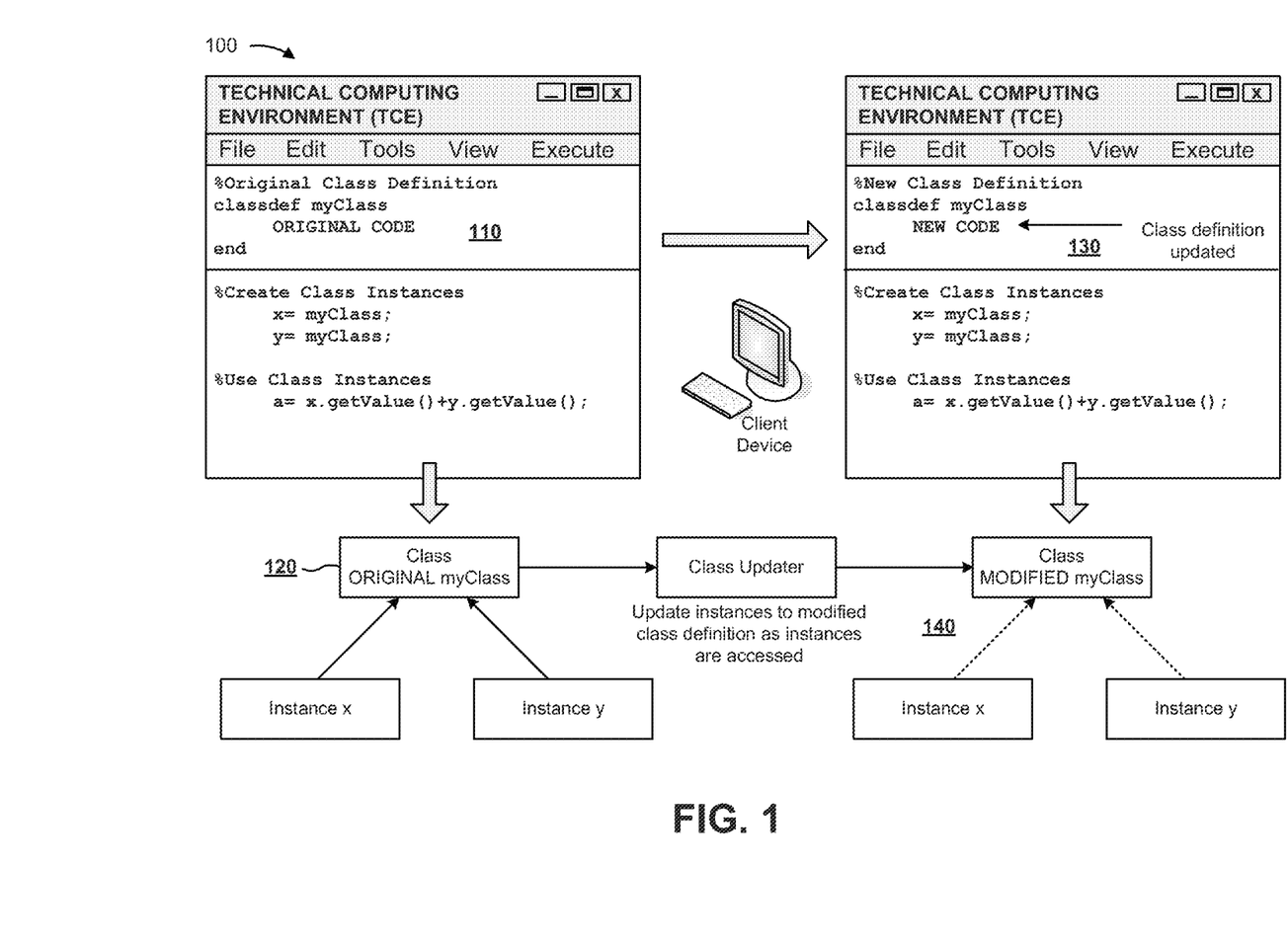
FIG. 1 is a diagram of an overview of an example implementation described herein.

FIG. 1 is a diagram of an overview of an example implementation 100 described herein. As shown in FIG. 1, assume that a technical computing environment (TCE), such as a computer programming environment, is executing on a client device, such as a desktop computer, a laptop computer, or the like. As shown, the TCE may provide a code editor that permits a user, such as a computer programmer, to input program code.

As shown by reference number 110, assume that the user interacts with the code editor to input program code to provide an original class definition for a class (e.g., "myClass"), to create instances of the class (e.g., "x" and "y"), and to use the class instances (e.g., by executing methods, included in the class definition, on the class instances). As shown by reference number 120, assume that execution of the program code causes the client device to create two class instances, instance x and instance y, that are based on the original class definition of myClass.

As shown by reference number 130, assume that the user updates the class definition for myClass from the original class definition to a modified class definition that includes new or modified program code (e.g., different from the original program code used for the original class definition of myClass). As shown by reference number 140, assume that execution of the program code causes the client device to update the class instances to the modified class definition as class instances are accessed. The client device may access class instances, for example, during program code execution, after detecting that the class definition has been modified, or the like.

As an example, when the client device executes program code that includes instance x, the client device may update instance x to conform to the modified class definition of myClass. When the client device executes program code that includes instance y, the client device may update instance y to reference the myClass class with the modified class definition. Once each class instance has been updated, the client device may delete the original class definition. In this way, the client device may update class instances as the instances are accessed by the computer program, without requiring a user to delete or recreate the class instances and without creating a situation where multiple class definitions are in use at the same time.

Figure 2:
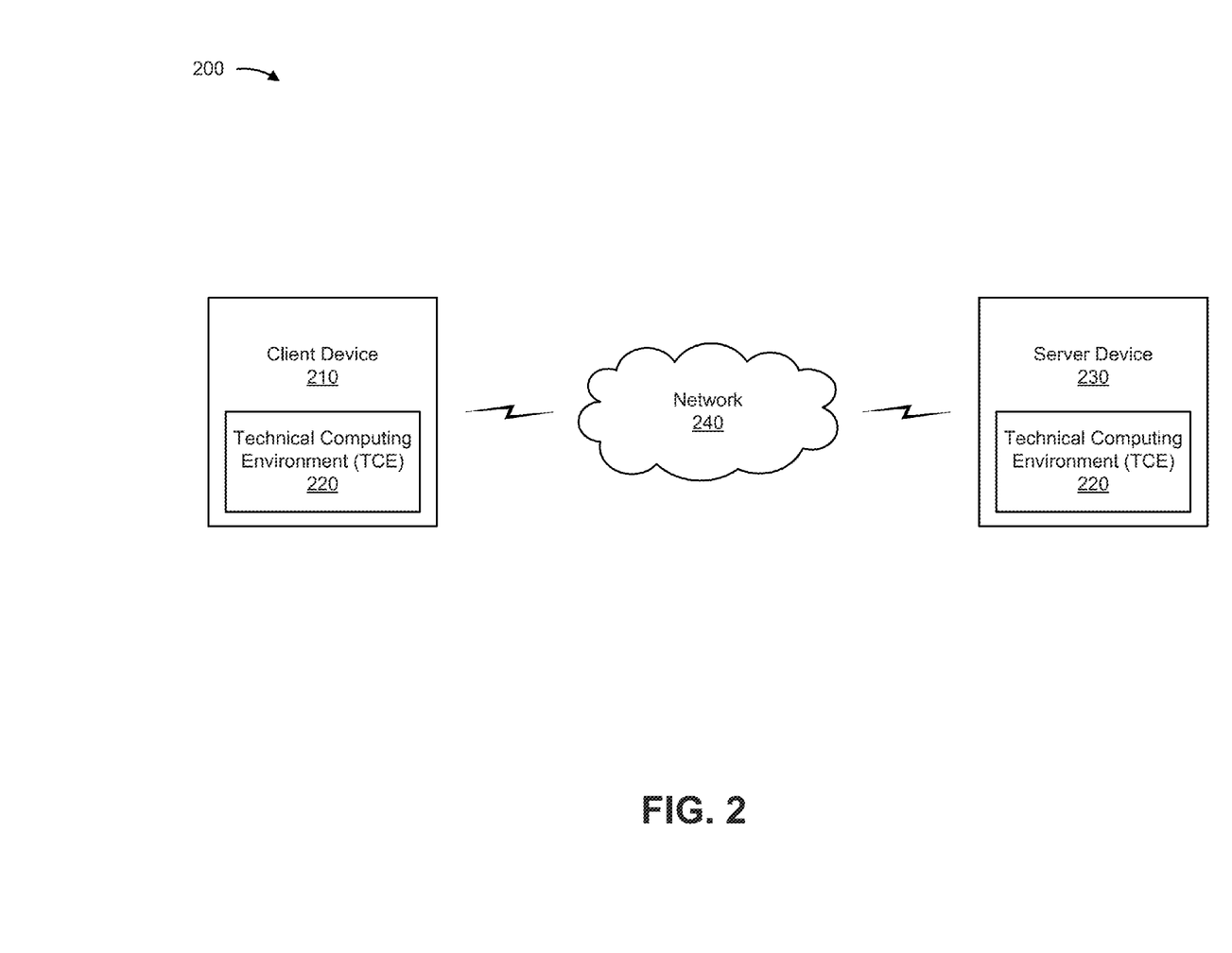
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include one or more devices capable of receiving, generating, storing, processing, and/or providing program code and/or information associated with program code. For example, client device 210 may include a computing device, such as a desktop computer, a laptop computer, a tablet computer, a mobile phone (e.g., a smart phone, a radiotelephone, etc.), or a similar device. Client device 210 may detect a modification to a class definition, and may update class instances to the modified class definition. For example, client device 210 may update class instances to the modified class definition as the instances are accessed by a computer program (e.g., executed by client device 210), without requiring a computer programmer to delete or recreate the class instances. In some implementations, client device 210 may receive information from and/or transmit information to server device 230.

Client device 210 may host TCE 220. TCE 220 may include any hardware-based component or a combination of hardware and software-based components that provides a computing environment that allows tasks to be performed (e.g., by users) related to disciplines, such as, but not limited to, mathematics, science, engineering, medicine, and business. TCE 220 may include a text-based environment (e.g., MATLAB® software by The MathWorks, Inc.), a graphically-based environment (e.g., Simulink® software, Stateflow® software, SimEvents® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment. Other example environments include Python, Julia, SciLab, Octave, or the like. TCE 220 may include, for example, a computer programming application that permits input of program code, interpretation of program code, compilation of program code, execution of program code, or the like.

Server device 230 may include one or more devices capable of receiving, generating, storing, processing, and/or providing program code and/or information associated with program code. For example, server device 230 may include a computing device, such as a server, a desktop computer, a laptop computer, a tablet computer, or a similar device. In some implementations, server device 230 may host TCE 220. In some implementations, client device 210 may be used to access one or more TCEs 220 running on one or more server devices 230. For example, multiple server devices 230 may be used to execute program code (e.g., serially or in parallel), and may provide respective results of executing the program code to client device 210.

In some implementations, client device 210 and server device 230 may be owned by different entities. For example, an end user may own client device 210, and a third party may own server device 230. In some implementations, server device 230 may include a device operating in a cloud computing environment. In this way, front-end applications (e.g., a user interface) may be separated from back-end applications (e.g., program code execution). Additionally, or alternatively, server device 220 may perform one, more, or all operations described elsewhere herein as being performed by client device 210.

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
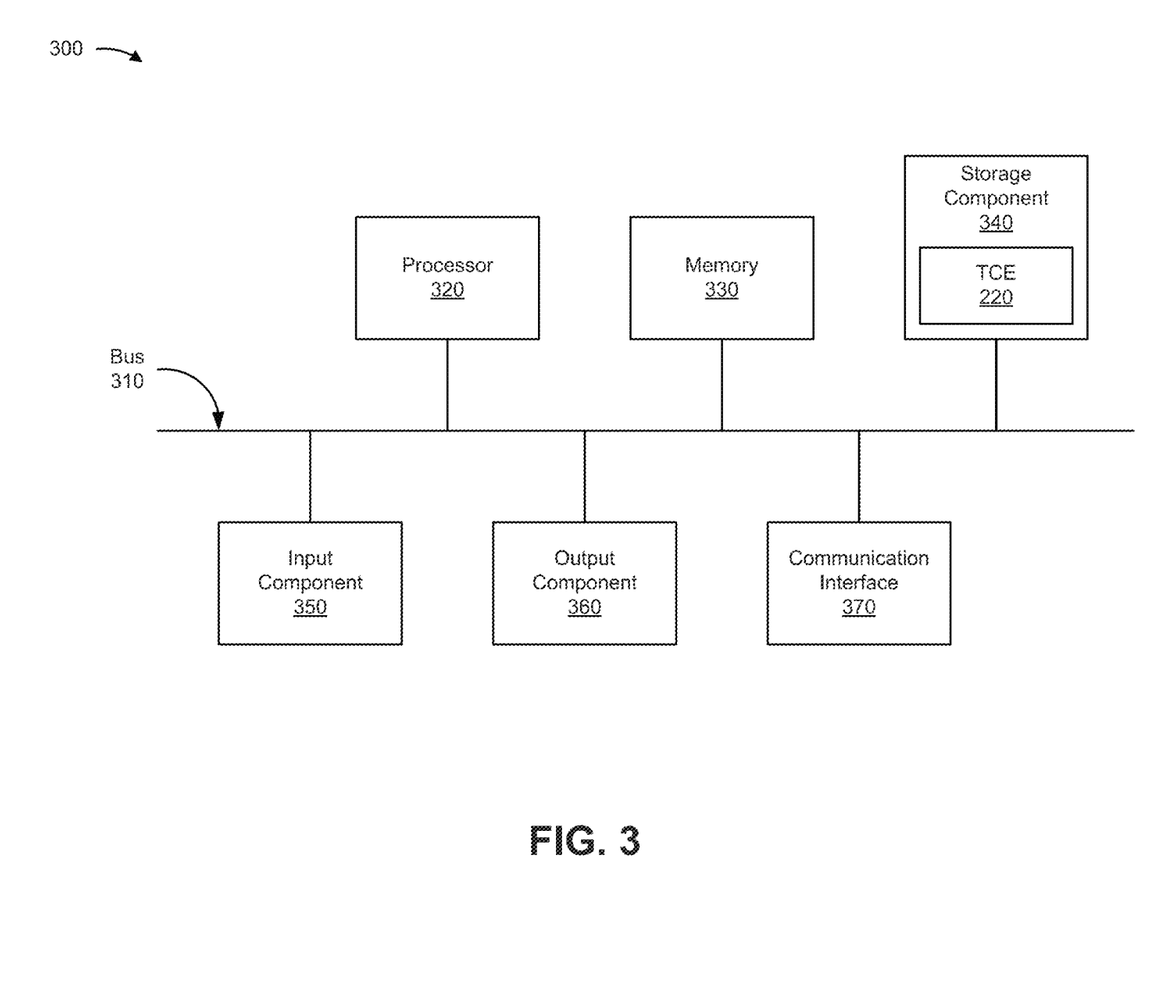
FIG. 3 is a diagram of example components of one or more devices of FIG. 2.

FIG. 3 is a diagram of example components of a device 300. Device 300 may correspond to client device 210 and/or server device 230. In some implementations, client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions, and/or that is designed to implement one or more computing tasks. In some implementations, processor 320 may include multiple processor cores for parallel computing. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIGS. 4A-4D are diagrams of an example implementation 400 of updating class instances to an updated class definition as the class instances are accessed.

Figure 4A:
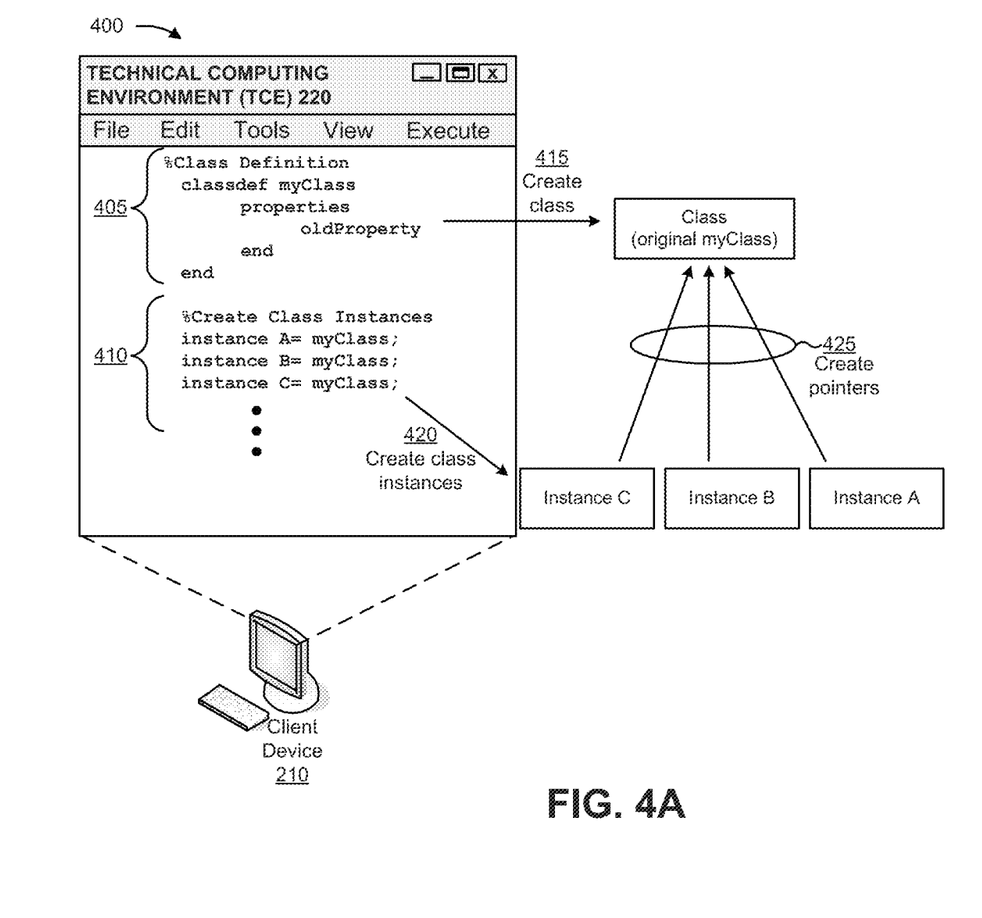
FIGS. 4A-4D are diagrams of an example implementation of updating class instances to an updated class definition as the class instances are accessed.

As shown in FIG. 4A, and by reference number 405, assume that a user interacts with TCE 220 to input a class definition for a class shown as myClass. Assume that the class definition includes a property shown as oldProperty. As shown by reference number 410, assume that the user interacts with TCE 220 to create class instances of the myClass class, shown as instance A, instance B, and instance C.

Based on the user input, client device 210 initializes and/or executes the program code to create an original class definition of myClass, as shown by reference number 415. Further, client device 210 creates class instances for instance A, instance B, and instance C, as shown by reference number 420. Client device 210 may create the class and the class instances as objects in memory, in some implementations. As shown by reference number 425, client device 210 creates a class pointer for each class instance, where the class pointers each reference the original class definition of myClass. Pointers are described herein as an example. In some implementations, client device 210 may use another mechanism to associate objects (e.g., a class instance and a class definition), such as a class name, an identifier (e.g., a numeric identifier), a map (e.g., a hash map, a binary search tree, etc.).

Figure 4B:
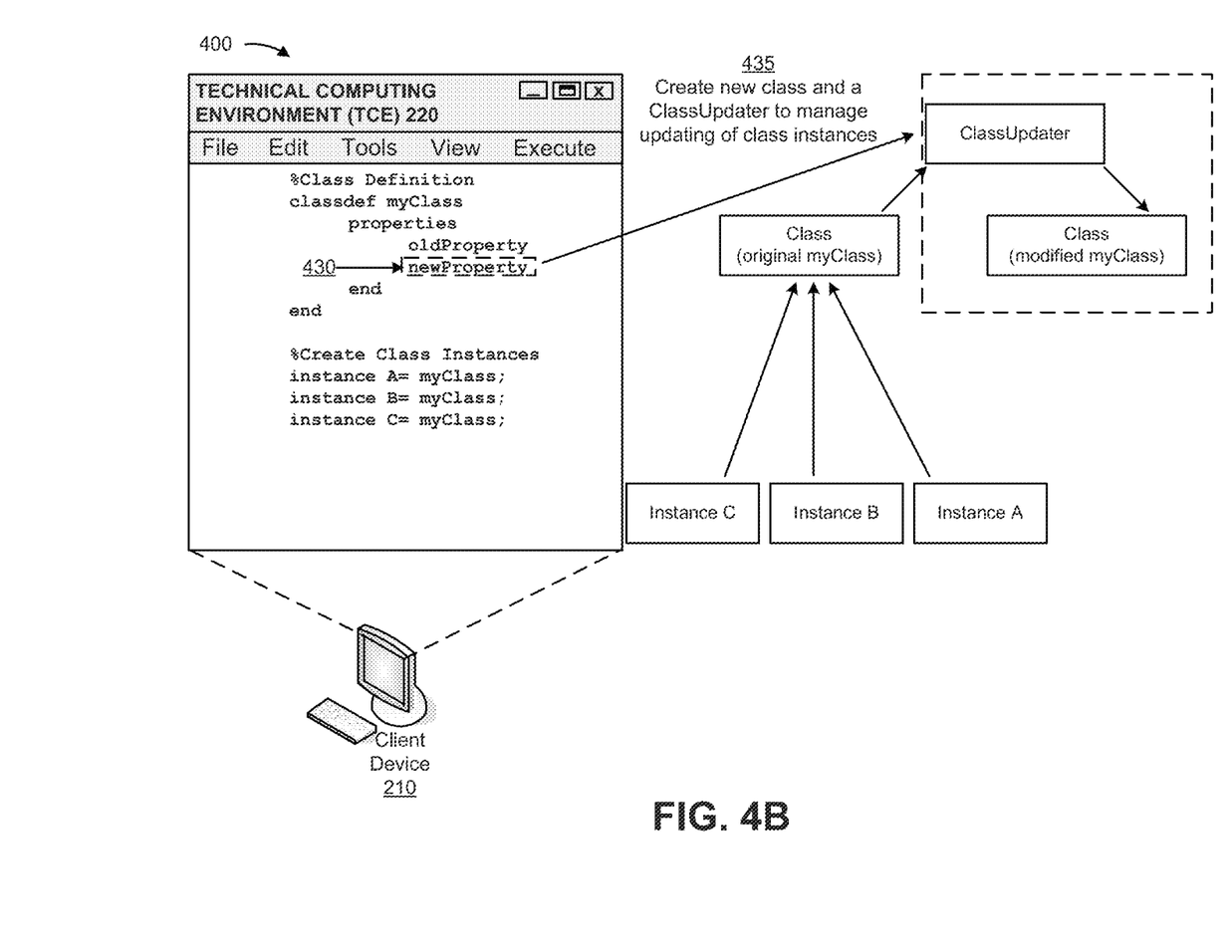

As shown in FIG. 4B, and by reference number 430, assume that the user modifies the myClass class definition to add a property to myClass, shown as newProperty. Assume that client device 210 detects the modification, and determines that the modification is a type of modification that is to be propagated to the class instances, as described in more detail elsewhere herein. Based on this determination, client device 210 creates a new class, shown as a modified class definition of myClass, and also creates a ClassUpdater object to manage the updating of class instances, as shown by reference number 435. As further shown, client device 210 creates a class pointer from the original class definition of myClass to the ClassUpdater object, and creates a class pointer from the ClassUpdater object to the modified class definition of myClass. In this way, the old class pointers associated with the class instances may be used to reference the modified class definition of myClass, via a new class pointer from the original class definition of myClass to the modified class definition of myClass (via the ClassUpdater object).

Figure 4C:
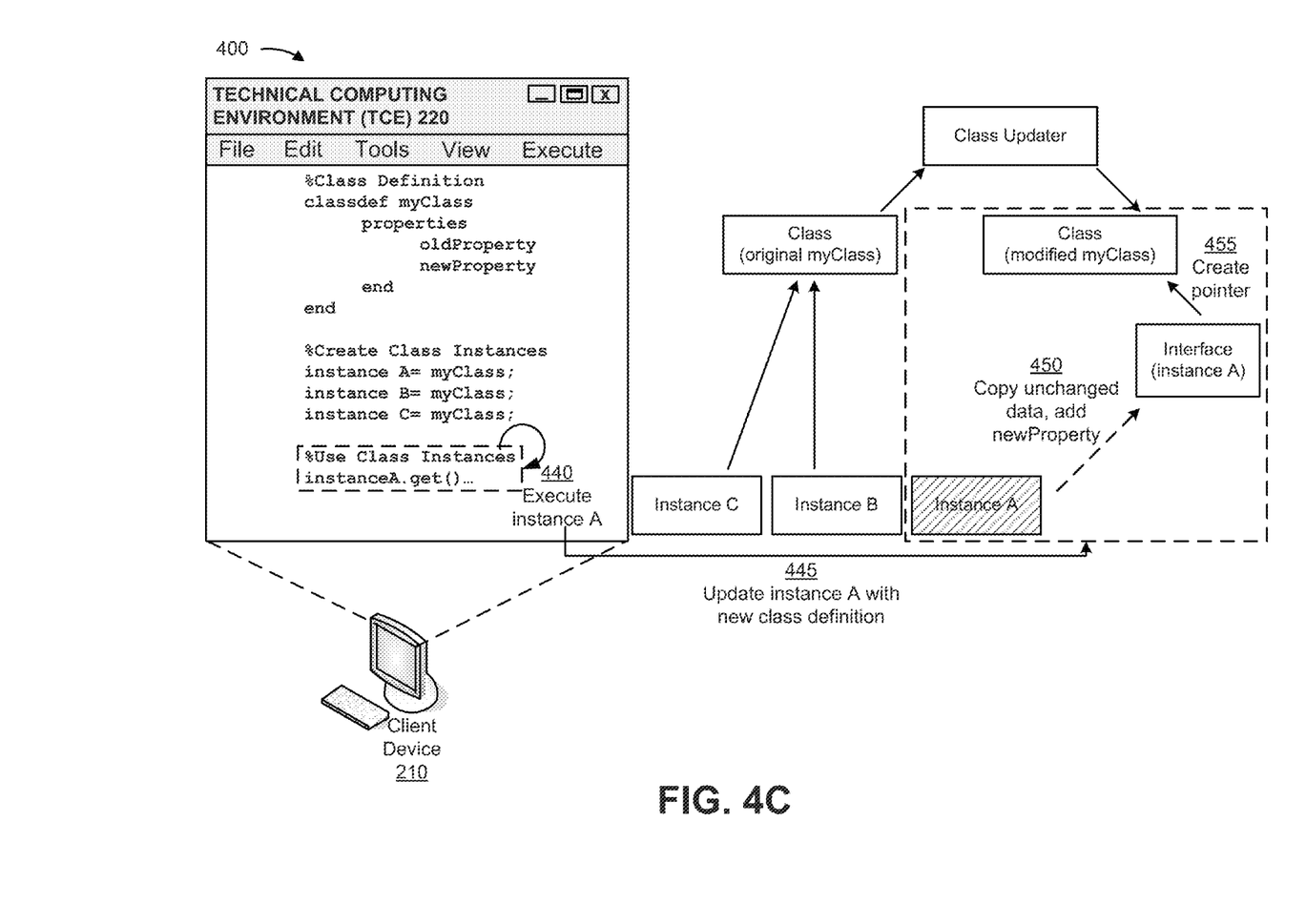

As shown in FIG. 4C, and by reference number 440, assume that client device 210 executes program code that includes instance A. Based on the execution, client device 210 determines that instance A references a new class pointer (via an old class pointer to the original class definition of myClass, which points to the modified class definition of myClass). Based on this determination, client device 210 updates instance A based on the modified class definition of myClass, as shown by reference number 445. For example, client device 210 copies unchanged data from the old instance A to the new instance A and adds the property newProperty to the new instance A, as shown by reference number 450. Further, client device 210 creates a class pointer between instance A and the modified class definition of myClass, as shown by reference number 455, and deletes the class pointer between instance A and the original class definition of myClass. In this way, client device 210 updates instance A during program code execution, without requiring the user to delete or recreate instance A.

Figure 4D:
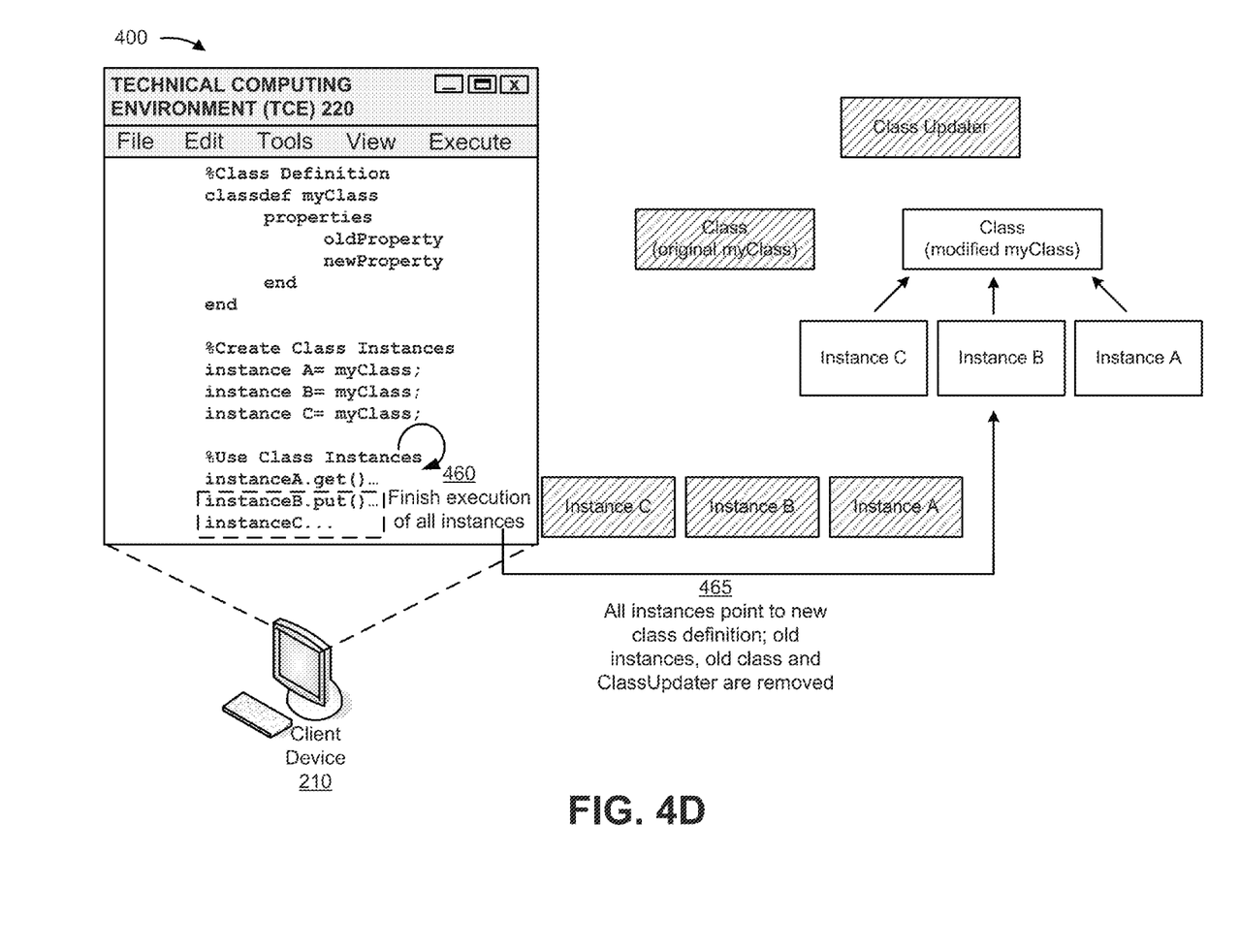

As shown in FIG. 4D, and by reference number 460, assume that client device 210 executes program code that includes instance B and instance C. Based on this execution, client device 210 updates instance B and instance C based on the modified class definition of myClass, in a similar manner as described above in connection with instance A. As shown by reference number 465, when client device 210 determines that all instances of myClass (e.g., instance A, instance B, and instance C) point to the modified class definition of myClass, client device 210 deletes all of the old instances (which may be deleted as they are updated), deletes the old class definition (e.g., the original class definition of myClass), and deletes the ClassUpdater object. In this way, client device 210 may update class instances during program code execution when a class definition is updated, and may remove the old class definition after all instances have been updated.

As indicated above, FIGS. 4A-4D are provided merely as an example. Other examples are possible and may differ from what was described with regard to FIGS. 4A-4D. For example, further examples are described below in connection with FIG. 5.

Figure 5:
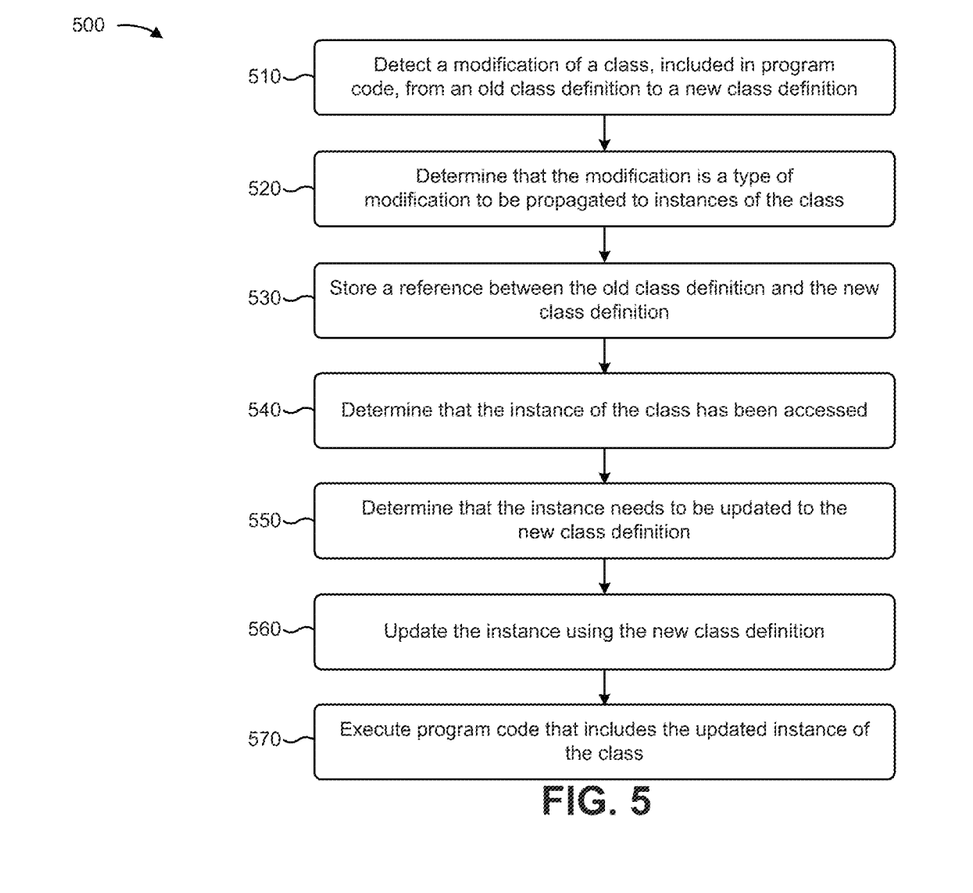
FIG. 5 is a flow chart of an example process for updating class instances to an updated class definition as the class instances are accessed.

FIG. 5 is a flow chart of an example process 500 for updating class instances to an updated class definition as the class instances are accessed. In some implementations, one or more process blocks of FIG. 5 may be performed by client device 210. In some implementations, one or more process blocks of FIG. 5 may be performed by another device or a group of devices separate from or including client device 210, such as server device 230.

As shown in FIG. 5, process 500 may include detecting a modification of a class, included in program code, from an old class definition to a new class definition (block 510). For example, client device 210 may detect that a class has been modified from an old class definition to a new class definition. A class may refer to an extensible program code template for creating instances of the class. A class definition may refer to program code used to define the template for the class. For example, the class definition may identify variables to be stored by a class instance, may identify properties associated with a class instance (e.g., variables capable of storing one or more values), may identify methods (e.g., functions, procedures, etc.) that may be performed using a class instance, may identify a parent class from which a class instance inherits one or more values (e.g., a variable, a property, a method, etc.), or the like.

Client device 210 may detect a modification of a class, for example, by detecting that program code, included in the class (e.g., the class definition) has changed (e.g., that a property, an event, an enumeration, an attribute, a method, or the like, has changed). Client device 210 may detect the modification, for example, when a user provides input to modify the class definition (e.g., to modify program code included in the class definition), when the user has finished providing input to modify the class definition, etc. In some implementations, client device 210 may analyze class definitions for modifications upon initiating execution of program code.

Additionally, or alternatively, client device 210 may detect a modification of a class definition based on a modification of a class definition file, based on a modification of a path that points to a class definition file (e.g., that replaces an old class definition with a new class definition), based on modification to a dynamically-generated class (e.g., a dynamically-generated C++ class), based on modification of a class via a software design tool, based on a change in a timestamp associated with a class definition file (e.g., an indication that the class definition file was edited), based on input provided via a command line interface, based on input provided via a code editor interface, based on the creation or modification of graphical representations (e.g., a block diagram) associated with program code, or the like.

In some implementations, client device 210 (e.g., TCE 220) may broadcast a message indicating that a class definition has been changed. Additionally, or alternatively, client device 210 may listen for changes to a file and/or program code that includes a class definition.

As further shown in FIG. 5, process 500 may include determining that the modification is type of modification to be propagated to instances of the class (block 520). For example, client device 210 may determine whether the modification is a type of modification that impacts instances of the class. If the modification does not impact instances of the class (e.g., the modification is to a comment in the program code), then client device 210 may not propagate the modification to the class instances. If the modification impacts instances of the class, then client device 210 may propagate the modification to one or more class instances, as described below in connection with blocks 530-570.

In some implementations, client device 210 may apply a set of rules to determine whether the modification is a type of modification to be propagated to instances of the class. For example, if the modification satisfies the rule, then client device 210 may update the class instances. If the modification does not satisfy the rule, then client device 210 may not update the class instances. Additionally, or alternatively, client device 210 may apply a checksum algorithm to all or part of the original class definition and the modified class definition to determine whether the modification is a type of modification to be propagated to instances of the class. If a checksum of the original class definition matches a checksum of the modified class definition, then client device 210 may determine that the modification is not to be propagated to class instances. If the checksums do not match, then client device 210 may determine that the modification is to be propagated to class instances.

In some implementations, client device 210 may determine that a modification is a type of modification to be propagated to class instances if for example, the modification changes a representation of the class instance, such as a memory layout of the class instance, a set of methods associated with the class instance, or the like. Depending on how instances are represented, client device 210 may propagate different types of modifications to class instances. Certain types of modifications will generally not result in changes to the instance, such as modifications to comments in the class definition that describe the workings of the class to human readers of the program code or graphical diagram. In some implementations, client device 210 may propagate a class definition modification to a class instance if the modification would result in a different representation (e.g., in memory) of the class instance had the class instance been created after the modification to the class definition.

As an example, addition of a property to a class, removal of a property from a class, modification of a class property, changing a default value of a property, and/or changing a property attribute value may be types of modifications that are to be propagated to instances of the class. For example, the following table explains behaviors associated with an updated class instance when example property attribute values are changed (e.g., from true to false, from false to true, from a first state to a second state, etc.):

| Attribute | New Value and Behavior |
|---|---|
| AbortSet | true - assignment or write on the property for existing instances will now be aborted if new value is the same as current value. |
| | false - assignment or write on the property for existing instances will not be aborted if the new value is the same as the current value. |
| Abstract | true - existing instances will be converted to a special object indicated that a prior instance is no longer valid because the new class definition is abstract and cannot be instantiated, as was possible prior to the change in class definition. |
| | false - since the class was previously abstract, no existing instance of this class can exist, but there could be existing subclasses of this super-class. If existing subclasses exist, they will not change. |
| Access | public - no change to existing instances, however if any code exists that was attempting to access this property (and failing), the code will no longer result in an error. |
| | protected - no change to existing instances, but if access was previously public, instances of other classes will no longer have access to the property. If access was previously private, existing instances of subclasses of this class will now have access. |
| | private - no change to existing instances, but if access was previously public, instances of other classes will no longer have access to the property. If access was previously protected, existing instances of subclasses will no longer have access. Changes to the access lists will not change existing instances. However, if classes are added to the access list, instances of those classes will now have access to this property. If classes are removed, instances of those classes will no longer have access to this property. |
| Constant | true - the property will be removed from existing instances |
| | false - the property will be added to existing instances. |
| Dependent | true - existing instances will no longer have storage for this property. If no get-method is defined, attempts to get the property will result in an error. |
| | false - storage may be added for this property. |
| GetAccess | Same as Access attribute |
| GetObservable | true - listeners can now be created for read access to this property on existing instances. |
| | false - new listeners can no longer be created for existing instances. Existing listeners for existing instances will no longer fire when a read (or get operation) for this property is executed. |

-continued

| Attribute | New Value and Behavior |
|---|---|
| Hidden | true - property will no longer be shown in a property list for existing instances (e.g., display, variable editor, calls to set or get, etc.).<br>false - property will now be shown in a property list for existing instances (e.g., display, variable editor, call to set or get, etc.). |
| SetAccess | Same as Access |
| Set-Observable | Same as GetObservable, except that the listeners are for write operations. |
| Transient | true - if an existing instance is saved or serialized, the property will not be serialized. If an existing instance was already serialized, if the object is deserialized, the property value will be deserialized.<br>false - if an existing instance is saved, the property will be serialized. If an instance was serialized prior to the modification of this attribute, the property was not serialized, so when the object is deserialized, the property will be assigned its default value if a default value exists. |

As another example, addition of a method to a class, removal of a method from a class, modification of a class method, and/or modification of a method attribute value may be types of modifications that are to be propagated to instances of the class. For example, the following table explains behaviors associated with an updated class instance when example method attribute values are changed:

| Attribute | New Value and Behavior |
|---|---|
| Abstract | true - existing instances will be converted to a special object indicated that a prior instance is no longer valid because the new class definition is abstract and cannot be instantiated, as was possible prior to the change in class definition.<br>false - since the class was previously abstract (e.g., because a class with an abstract method is an abstract class), no existing instance of this class can exist, but there could be existing subclasses of this super-class. If existing subclasses exist, the existing subclasses will not change. |
| Access | public - no change to existing instances, however if any code exists that was attempting to access this method (and failing), the code will no longer result in an error.<br>protected - no change to existing instances, but if access was previously public, instances of other classes will no longer have access to the method. If access was previously private, existing instances of subclasses of this class will now have access.<br>private - no change to existing instances, but if access was previously public, instances of other classes will no longer have access to the method. If access was previously protected, existing instances of subclasses will no longer have access.<br>Changes to the access lists will not change existing instances. However, if classes are added to the access list, instances of those classes will now have access to this method. If classes are removed, instances of those classes will no longer have access to this method. |
| Hidden | true - method name no longer shows in the list of methods displayed using the methods command, the methodsview command, or another tool that provides information about the class and members of the class.<br>false - method name will show in the list of methods displayed using a methods command, a methodsview command, or another tool that provides information about the class and members of the class. |
| Sealed | true - if a method becomes sealed and existing subclasses already have the method defined, the new class definition will not be able to be applied to the existing subclasses (since this is an error condition), so no update will occur. If the method has not been defined in a subclass, existing instances of that subclass will be updated.<br>false - this method can now be defined in existing subclasses. |

-continued

| Attribute | New Value and Behavior |
|---|---|
| Static | true - if a method becomes static, no changes to existing instances of this class are necessary.<br>false - if a method becomes non-static, no changes to existing instances of this class. |

As another example, addition of an event to a class, removal of an event from a class, modification of a class event, and/or modification of an event attribute value may be types of modifications that are to be propagated to instances of the class. For example, the following table explains behaviors associated with an updated class instance when example event attribute values are changed:

| Attribute | New Value and Behavior |
|---|---|
| Hidden | true - event will no longer appear in the list of events returned by events function or other event listing functions or viewers.<br>false - event will now appear in the list of events returned by events function or other event listing functions or viewers. |
| ListenAccess | public - no change to existing instances or listeners that have already been created for this event. New listeners can now be created without any access restrictions.<br>protected - no change to existing instances or listeners that have already been created for this event. New listeners can now only be created within the class or subclasses.<br>private - no change to existing instances or listeners that have already been created for this event. New listeners can now only be created within the class.<br>Changes to the access lists will not change existing instances. However, if classes are added to the access list, instances of those classes will now be allowed to create listeners for this event. If classes are removed, instances of those classes will no longer be able to create listeners for this event. |
| NotifyAccess | public - no change to existing instances. This event can now be triggered without any access restrictions.<br>protected - no change to existing instances. This event can now only be triggered within the class or subclasses.<br>private - no change to existing instances. This event can now only be triggered within the class.<br>Changes to the access lists will not change existing instances. However, if classes are added to the access list, instances of those classes will now be allowed to trigger this event. If classes are removed, instances of those classes will no longer be able to trigger this event. |

As another example, addition of a class attribute, removal of a class attribute, and/or modification of a class attribute may be types of modifications that are to be propagated to instances of the class. For example, the following table explains behaviors associated with an updated class instance when example class attributes are changed:

| Attribute | New Value and Behavior |
|---|---|
| Abstract | true - existing instances will be converted to a special object indicated that a prior instance is no longer valid because the new class definition is abstract and cannot be instantiated, as was possible prior to the change in class definition.<br>false - since the class was previously abstract, no existing instance of this class can exist, but there could be existing subclasses of this super-class. If existing subclasses exist, they will not change. |

| Attribute | New Value and Behavior |
|---|---|
| Allowed-Subclasses | No change to existing instances if the AllowedSubclasses list changes. |
| Handle-Compatible | Changing this would have no impact to existing instances. It only relates to other super-classes that can be used. |
| Hidden | true - this class will no longer appear in the output of the superclasses function, the help function, or other class listening functions or viewers.<br>false - this class will now appear in the output of the superclasses function, the help function, or other class listening functions or viewers. |
| Inferior-Classes | The new or modified inferior class rules will apply to existing instances when calling methods and functions. |
| Sealed | true - existing instances of this class and subclasses of the newly sealed class will continue to exist. Attempts to create new instances of a subclass will fail. Attempts to create new instances of this class will succeed.<br>false - no changes to existing instances. Since the class was previously sealed, there should be no subclass instances. |

In some implementations, client device 210 may store one or more of the tables described above in one or more data structures. In this way, client device 210 may apply one or more rules to update class instances when a class definition is modified.

As another example, addition of a variable to a class, removal of a variable from a class, and/or modification of a class variable may be types of modifications that are to be propagated to instances of the class. As another example, addition of a parent class (e.g., a super-class) to a class, removal of a parent class from a class, and/or modification of a parent class (e.g., modification of a property, method, etc. included in a super-class) may be types of modifications that are to be propagated to instances of the class.

Other examples of types of modifications that may be propagated to class instances include: modification of a class from a handle type (e.g., a reference) to a value type, modification of a class from a value type to a handle type, adding an enumeration member to a class, removing an enumeration member from a class, adding an enumeration block to a class, removing an enumeration block from a class, changing a class attribute, or the like.

In some implementations, modification of a class from a concrete class to an abstract class may be a type of modification that is to be propagated to instances of the class. In this case, when client device 210 updates a class instance, client device 210 may store information associated with the class instance that would otherwise be lost as the class instance is updated from being associated with a concrete class definition to an abstract class definition. In this way, client device 210 may permit a user to access information that would otherwise be deleted.

As further shown in FIG. 5, process 500 may include storing a reference between the old class definition and the new class definition (block 530). For example, based on determining that the modification is a type of modification to be propagated to instances of the class, client device 210 may store a reference, such as a relationship indicator, that indicates a relationship between an old class definition and a new class definition. For example, client device 210 may store a relationship indicator between an old class definition and a new class definition. Additionally, or alternatively, client device 210 may store a relationship indicator between an old class pointer and a new class pointer, where the old class pointer identifies (e.g., points to) the old class definition, and the new class pointer identifies the new class definition. A relationship indicator may include, for example, a pointer, a map, a key-value pair, an association in a lookup table, a handle, or the like.

Client device 210 may store the reference (e.g., the relationship indicator), between the old class definition and the new class definition, in a data structure. When client device 210 accesses a class instance (e.g., executes program code that includes the class instance) before the modification to the class (e.g., when the class instance is instantiated), the class instance may be associated with the old class definition and/or an old class pointer that points to the old class definition. In this way, client device 210 may apply the old class definition (e.g., an original class definition) to the class instance before the modification to the class occurs. After client device 210 detects a modification to the class, client device 210 may store a reference between the old class definition and the new class definition (e.g., a reference from the old class pointer to the new class pointer), so that when the class instance is accessed, client device 210 may replace the old class definition with the new class definition (e.g., may replace an old class pointer with a new class pointer), as described in more detail below.

Additionally, or alternatively, based on determining that the modification is a type of modification to be propagated to instances of the class, client device 210 may store an update indicator (e.g., a bit with a particular value) that indicates that the class definition has been modified. Client device 210 may store an association between the update indicator and the class, so that when a class instance is referenced, client device 210 may easily determine that the class instance requires an update (e.g., based on reading the update indicator). In some implementations, the update indicator may include a particular type of class, such as the ClassUpdater class shown in FIGS. 4B-4D.

As further shown in FIG. 5, process 500 may include determining that the instance of the class has been accessed (block 540). For example, client device 210 may access the instance of the class. In some implementations, client device 210 may access the instance of the class after the class definition has been modified. For example, client device 210 may update the instance of the class, using the new class definition, the first time the instance is accessed after the modification of the class definition. In this way, client device 210 may avoid wasting computing resources by updating instances that are not accessed. Further, client device 210 may avoid time delays associated with updating all class instances at once. However, in some implementations, client device 210 may update all class instances (e.g., sequentially, in parallel) after detecting the modification of the class definition.

As an example, client device 210 may access the instance of the class by executing and/or causing execution of program code, that includes the instance of the class, after the class definition has been modified. For example, client device 210 may cause execution of the program code locally (e.g., by client device 210). Additionally, or alternatively, client device 210 may cause execution of the program code remotely, such as by providing the program code portion to another device (e.g., server device 230) for execution.

As further shown in FIG. 5, process 500 may include determining that the instance needs to be updated to the new class definition (block 550). For example, client device 210 may determine that the instance needs to be updated to the new class definition by determining that the instance is associated with the old class definition (e.g., via an old class pointer), by identifying a stored reference (e.g., a relationship indicator) between the old class definition and the new class definition, or the like.

As an example, assume that executed program code includes a class instance of a class that has been modified from an old class definition to a new class definition (e.g., with a type of modification to be propagated to class instances). In this case, client device 210 may identify the class instance by determining that the class instance is associated with the old class definition, by determining that the class instance is associated with the old class pointer, by determining that the old class pointer has been referenced, by determining that the old class pointer has referenced the new class pointer, by determining that the new class pointer has been referenced, or the like. As an example, execution of the program code that includes the class instance may cause the old class pointer to be accessed, which may cause the new class pointer to be accessed (e.g., since client device 210 has stored a reference from the old class pointer to the new class pointer). Client device 210 may detect this access to the new class pointer.

As further shown in FIG. 5, process 500 may include updating the instance using the new class definition (block 560). For example, client device 210 may update the class instance based on the new class definition. In some implementations, client device 210 may update the class instance by propagating a modification, of the class, to the class instance. For example, client device 210 may add a property (or a variable, a method, a super-class, or the like) to the class instance, may remove a property (or a variable, a method, a super-class, or the like) from the class instance, may modify a property (or a variable, a method, a super-class, or the like) of the class instance, or the like. In some implementations, client device 210 may provide an option that permits a user to decide whether to update the class instance to the new class definition, or whether to retain the old class definition.

In some implementations, client device 210 may update the instance by modifying an existing instance (e.g., to add a property, method, etc., to remove a property, method, etc., to modify a property, method, etc.). Additionally, or alternatively, client device 210 may update the instance by creating a new instance with modifications, copying valid information, associated with the old instance, to the new instance, and deleting the old instance. For example, client device 210 may update the instance by copying valid state information, associated with the old instance, to the new instance. Valid state information may include, for example, valid property values (e.g., that are still valid in the new class definition), dynamic properties (e.g., metadata and current values), event listeners, object hierarchy information, or the like.

Once the class instance has been updated based on the modification to the class, client device 210 may store a relationship indicator that indicates a relationship between the class instance and the new class definition. Additionally, or alternatively, client device 210 may delete (e.g., from memory) a relationship indicator that indicates a relationship between the class instance and the old class definition. In this way, client device 210 may update class instances as the class instances are encountered (e.g., referenced, executed, etc.) in program code. Additionally, or alternatively, once all class instances have been updated, client device 210 may delete the old class definition.

In some implementations, a class may be modified multiple times before a class instance is updated. In this case, client device 210 may store a reference between the old class pointer and the newest class pointer (e.g., associated with the most recent modification to the class). In this way, when program code that includes a class instance is executed, the class instance may be updated to the newest class definition, rather than an intermediate class definition that has been replaced with the newest class definition.

As an example, assume that two class instances, instance X and instance Y, are associated with a first class definition of a class myClass. Assume that the first class definition of myClass is modified to create a second class definition of myClass. Further, assume that client device 210 executes program code that includes instance X, and updates instance X to the second class definition of myClass. Assume that myClass is again modified to create a third class definition of myClass, before client device 210 executes program code that includes instance Y (e.g., before instance Y is updated to the second class definition of myClass). In this case, when client device 210 executes program code that includes instance X or instance Y, these instances will be updated to the third class definition of myClass. For example, client device 210 may update instance X from the second class definition to the third class definition, and may update instance Y from the first class definition to the third class definition. Each class definition may be associated with different pointers, which may point to one another to permit the class instances to be updated in this manner.

In some implementations, such as where multiple execution threads have access to the instance, client device 210 may halt execution of all execution threads before updating the instance. Additionally, or alternatively, client device 210 may associate the instance with an indicator (e.g., a mutex object) to prevent execution of the instance during the update.

As further shown in FIG. 5, process 500 may include executing program code that includes the updated instance of the class (block 570). For example, after updating a class instance, client device 210 may execute the updated class instance. The updated class instance may be associated with the new class definition. In this way, client device 210 may permit a computer programmer to update classes, when class instances have already been created, without requiring the class instances to be deleted or recreated by a user.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Implementations described herein permit class changes to be propagated to class instances on-the-fly, such as while the computer program is executing, without having to completely delete and recreate the class instances.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Program code (sometimes referred to herein as code) is to be broadly interpreted to include text-based code that may not require further processing to execute (e.g., C++ code, Hardware Description Language (HDL) code, very-high-speed integrated circuits (VHSIC) HDL (VHDL) code, Verilog code, Java code, another type of hardware and/or software based code that may be compiled and/or synthesized, etc.), binary code that may be executed (e.g., executable files that may be directly executed by an operating system, bitstream files that may be used to configure an FPGA, Java byte code, object files combined together with linker directives, source code, makefiles, etc.), text files that may be executed in conjunction with other executables (e.g., Python text files, Octave files, a collection of dynamic-link library (DLL) files with text-based combining, configuration information that connects pre-compiled modules, an extensible markup language (XML) file describing module linkage, etc.), source code (e.g., readable by a human), machine code (e.g., readable by a machine), or the like. In some implementations, program code may include different combinations of the above-identified classes of code (e.g., text-based code, binary code, text files, source code, machine code, etc.). Additionally, or alternatively, program code may include code generated using a dynamically-typed programming language (e.g., the M language, a MATLAB® language, a MATLAB-compatible language, a MATLAB-like language, etc.) that may be used to express problems and/or solutions using mathematical notations. Additionally, or alternatively, program code may be of any type, such as a function, a script, an object, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory storing instructions; and
one or more processors that execute instructions to:
    detect a modification of a class, included in a first portion of program code, from a first class definition to a second class definition that is different from the first class definition,
        the first class definition being associated with one or more class instances, of the class, included in a second portion of program code;
    determine that the modification of the class is a type of modification to be propagated to the one or more class instances,
        the type of modification being a type that impacts the one or more class instances;
    store a reference between the first class definition and the second class definition based on determining that the modification of the class is the type of modification to be propagated;
    determine that a class instance, of the one or more class instances, has been accessed;
    detect the reference between the first class definition and the second class definition based on determining that the class instance has been accessed;
    create an updated class instance during execution of the second portion of program code and based on detecting the reference between the first class definition and the second class definition,
        when creating the updated class instance, the one or more processors are to:
            copy data from the class instance to the updated class instance, and
            add a new property to the updated class instance;
    determine that all class instances of the class have been updated based on the updated class instance; and
    delete the first class definition based on determining that all class instances of the class have been updated.

2. The device of claim 1, where the one or more processors, when creating the updated class instance, are to:
create the updated class instance while the second portion of program code is being executed.

3. The device of claim 1,
where the one or more processors are further to:
    determine that the modification includes at least one of:
        a modification of a property included in the class, or
        a modification of a method included in the class; and
where the one or more processors, when storing the reference, are to:
    store the reference based on determining that the modification includes at least one of:
        the modification of the property included in the class, or
        the modification of the method included in the class.

4. The device of claim 1, where the one or more processors, when storing the reference between the first class definition and the second class definition, are to:

create a class updater object; and
store an association between the class and the class updater object,
the association between the class and the class updater object indicating that the class has been modified.

5. The device of claim 1, where the one or more processors are further to:
store an indication that the class instance has been updated to the second class definition based on creating the updated class instance,
the indication preventing the device from initiating another update of the class instance to the second class definition.

6. The device of claim 1, where the one or more processors, when determining that the class instance has been accessed, are to:
execute program code that includes the class instance; and
determine that the class instance has been accessed based on executing the program code that includes the class instance.

7. The device of claim 1, where the one or more processors, when determining that the modification of the class is the type of modification to be propagated, are to:
determine that a first checksum of the first class definition does not match a second checksum of the second class definition, and
determine that the modification of the class is the type of modification to be propagated based on determining that the first checksum of the first class definition does not match the second checksum of the second class definition.

8. A non-transitory computer-readable medium storing instructions, the instructions comprising:
one or more instructions that, when executed by one or more processors, cause the one or more processors to:
detect a modification of a class, included in a first portion of program code, from a first class definition to a second class definition that is different from the first class definition, the first class definition being associated with a class instance, of the class, included in a second portion of program code;
determine that the modification of the class is a type of modification to be propagated to the class instance, the type of modification being a type that impacts the class instance;
store an association between the first class definition and the second class definition based on determining that the modification of the class is the type of modification to be propagated;
access the class instance;
detect the association between the first class definition and the second class definition based on accessing the class instance;
create an updated class instance during execution of the second portion of program code and based on detecting the association between the first class definition and the second class definition,
the one or more instructions, that cause one or more processors to create the updated class instance, cause the one or more processors to:
copy data from the class instance to the updated class instance, and
add a new property to the updated class instance;
determine that all class instances of the class have been updated based on the updated class instance; and
prevent the first class definition from being used based on determining that all class instances of the class have been updated.

9. The non-transitory computer-readable medium of claim 8, where the one or more instructions, that cause the one or more processors to access the class instance, cause the one or more processors to:
execute the second portion of program code that includes the class instance; and
access the class instance based on executing the second portion of program code.

10. The non-transitory computer-readable medium of claim 8,
where the class instance is a first class instance associated with the first class definition; and
where the one or more instructions, that cause the one or more processors to create the updated class instance, cause the one or more processors to:
create a second class instance, during execution of the second portion of program code, based on the second class definition,
the second class instance being different from the first class instance;
associate the second class instance with the second class definition;
copy valid information, not impacted by the modification of the class, from the first class instance to the second class instance; and
delete the first class instance.

11. The non-transitory computer-readable medium of claim 8,
where the new property is a first property;
where the modification includes at least one of:
addition of the first property to the class,
removal of a second property from the class, or
modification of a third property included in the class; and
where the one or more instructions, that cause the one or more processors to create the updated class instance, cause the one or more processors to:
update the class instance based on the addition of the first property, the removal of the second property, or the modification of the third property.

12. The non-transitory computer-readable medium of claim 8, where the modification of the class includes a modification of a super-class to which the class belongs.

13. The non-transitory computer-readable medium of claim 8, where the one or more instructions, when executed by the one or more processors, cause the one or more processors to:
execute program code that includes the updated class instance based on creating the updated class instance.

14. The computer-readable medium of claim 8,
where the one or more instructions, that cause the one or more processors to store the association between the first class definition and the second class definition, cause the one or more processors to:
create a class updater object;
store an association between the first class definition and the class updater object;
store an association between the second class definition and the class updater object; and
where the one or more instructions, when executed by the one or more processors, further cause the one or more processors to:

delete the class updater object based on determining that all class instances of the class have been updated using the second class definition.

15. A method, comprising:
   detecting a modification of a class, included in first portion of program code, from a first class definition to a second class definition that is different from the first class definition,
      the first class definition being associated with one or more class instances, of the class, included in a second portion of program code,
      the detecting the modification being performed by one or more devices;
   determining that the modification of the class is a type of modification to be propagated to the one or more class instances,
      the type of modification being a type that impacts the one or more class instances;
   creating a relationship indicator that references the second class definition and that indicates that the class has been modified based on determining that the modification of the class is the type of modification to be propagated,
      the creating being performed by the one or more devices;
   storing an association between the class and the relationship indicator,
      the storing being performed by the one or more devices;
   accessing an instance of the class associated with the first class definition,
      the accessing being performed by the one or more devices;
   detecting the association between the class and the relationship indicator based on accessing the instance of the class,
      the detecting the association being performed by the one or more devices;
   creating an updated class instance during execution of the second portion of program code and based on detecting the association between the class and the relationship indicator,
      the creating the updated class instance being performed by the one or more devices, and
      the creating the updated class instance including:
         copying data from the class instance to the updated class instance, and
         adding a new property to the updated class instance;
   determining that all instances of the class have been updated based on the updated class instance,
      the determining that all instances of the class have been updated being performed by the one or more devices; and
   deleting the first class definition based on determining that all instances of the class have been updated from the first class definition to the second class definition,
      the deleting the first class definition being performed by the one or more devices.

16. The method of claim 15, further comprising:
   executing program code that includes the class instance,
      the executing the program code that includes the class instance causing the second class definition to be used for the class instance.

17. The method of claim 15, where the modification includes at least one of:
   addition, removal, or modification of a method included in the class,
   addition of the new property,
   removal or modification of another property included in the class,
   addition, removal, or modification of an event included in the class,
   addition, removal, or modification of an attribute associated with the class, or
   addition, removal, or modification of a super-class associated with the class.

18. The method of claim 15,
   where the modification includes at least one of:
      addition of a first event to the class,
      removal of a second event from the class, or
      modification of a third event included in the class; and
   where creating the updated class instance comprises:
      updating the instance of the class based on the addition of the first event, the removal of the second event, or the modification of the third event.

19. The method of claim 15, further comprising:
   storing an indication that the instance of the class has been updated to the second class definition based on creating the updated class instance,
      the indication preventing the one or more devices from initiating another update of the instance to the second class definition.

20. The method of claim 15, further comprising:
   deleting the relationship indicator based on determining that all instances of the class have been updated from the first class definition to the second class definition.

* * * * *